United States Patent [19]
Alderman

[11] Patent Number: 6,100,665
[45] Date of Patent: Aug. 8, 2000

[54] ELECTRICAL POWER SYSTEM WITH RELATIVELY-LOW VOLTAGE INPUT AND METHOD

[76] Inventor: Robert J. Alderman, 686 Highland Ter., Canyon Lake, Tex. 78133

[21] Appl. No.: 09/318,701

[22] Filed: May 25, 1999

[51] Int. Cl.$^7$ .................................................. H01M 10/46
[52] U.S. Cl. ............................................................ 320/127
[58] Field of Search ..................................... 320/103, 127, 320/128; 363/59, 60; 429/12

[56] References Cited

U.S. PATENT DOCUMENTS

| | | | |
|---|---|---|---|
| 3,823,358 | 7/1974 | Rey | 320/3 |
| 4,670,702 | 6/1987 | Yamada et al. | 320/21 |
| 4,839,574 | 6/1989 | Takabayashi | 320/3 |
| 5,051,881 | 9/1991 | Herold | 363/59 |
| 5,139,894 | 8/1992 | Mizuno et al. | 429/9 |
| 5,399,956 | 3/1995 | DeLuca et al. | 363/59 X |
| 5,526,253 | 6/1996 | Duley | 363/59 |
| 5,568,035 | 10/1996 | Kato et al. | 363/59 X |
| 5,625,544 | 4/1997 | Kowshik et al. | 363/59 |
| 5,759,712 | 6/1998 | Hockaday | 429/30 |

*Primary Examiner*—Edward H. Tso
*Attorney, Agent, or Firm*—Thomas, Kayden, Horstemeyer & Risley

[57] ABSTRACT

A preferred embodiment of the electrical power system with relatively-low voltage input includes a power source, i.e. a fuel cell, battery, solar cell, etc, that is configured to provide a first output voltage which is lower than the battery output voltage of a rechargeable battery to be charged. A voltage multiplier circuit is electrically interconnected to the power source and is configured to removably electrically interconnect with the rechargeable battery during charging. The voltage multiplier circuit is configured to receive the first output voltage from the power source, convert the first output voltage to a boosted voltage and provide the boosted voltage to the rechargeable battery. In order to facilitate the recharging of the rechargeable battery, the boosted voltage is provided at a voltage which is at least equal to the battery output voltage.

10 Claims, 4 Drawing Sheets

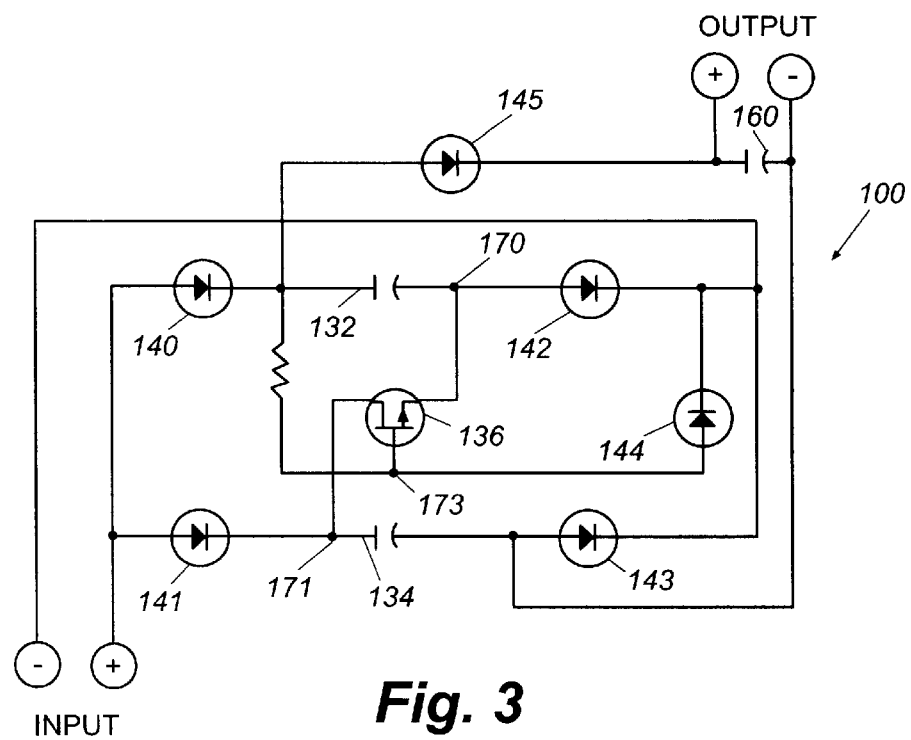
Fig. 3
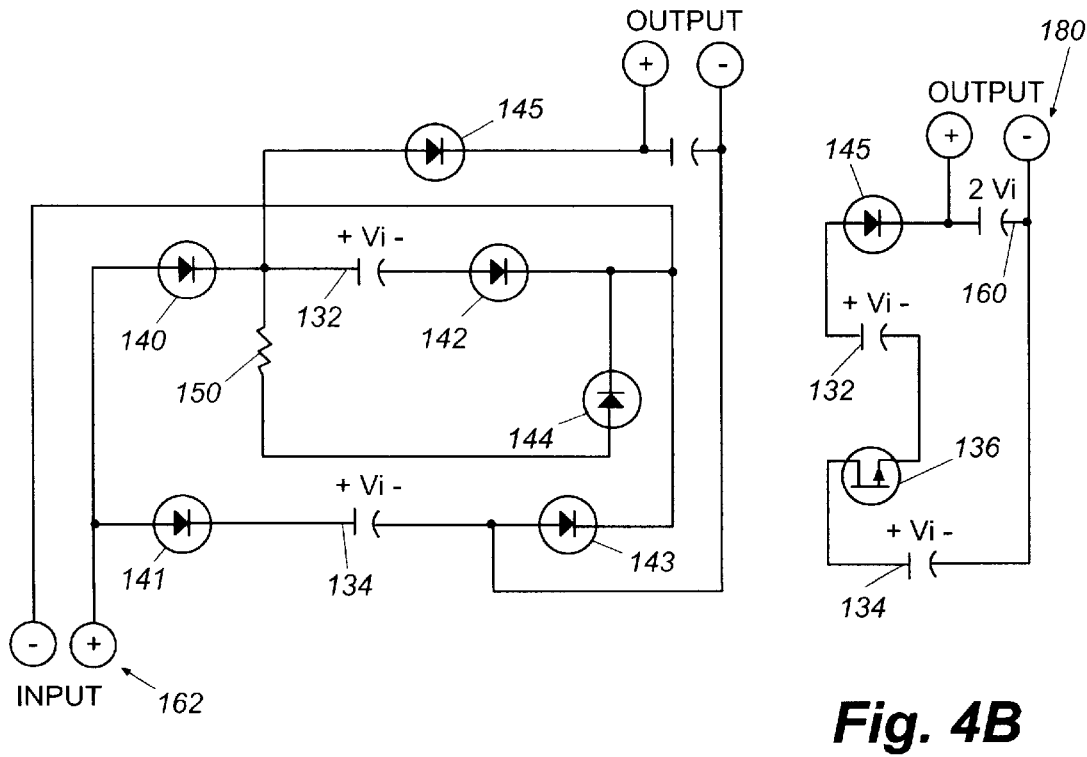
Fig. 4A
Fig. 4B

ELECTRICAL POWER SYSTEM WITH RELATIVELY-LOW VOLTAGE INPUT AND METHOD

BACKGROUND OF THE INVENTION

1. Field of the Invention

The present invention relates to an electrical power system for recharging batteries. More specifically, the power system utilizes a power source which is configured to provide a first output voltage that is lower than a minimum required input voltage for recharging a battery.

2. Description of the Related Art

Rechargeable batteries for providing renewable sources of direct current (DC) electric power are well known in the prior art and are particularly well suited for use with electronic devices, such as a portable drills, video cameras, etc, because the batteries are relatively small and light weight. However, when a rechargeable battery runs low on charge, the electronic device being powered by the battery typically is removed from service while the battery is being recharged or until a charged replacement battery is connected to the device. This results in the inability of an operator to use the electronic device while the battery is being recharged or requires that the operator keep at least one substitute battery available for use, e.g. a fully charged battery, when the first battery is being recharged. However, since the cost of a rechargeable battery can be significant, keeping two or more batteries adapted for use with each electronic device can be cost prohibitive.

Rechargeable batteries typically are recharged by relatively-high voltage power sources, e.g. power sources possessing higher output voltages than the batteries to be charged, such as AC/DC converters or relatively-high voltage output batteries. Neither the AC/DC converters nor the high output batteries, however, are particularly well suited for use in charging batteries in remote locations, such as at a campsite, for instance, because the AC/DC converters require an alternating current power source, which may not be readily accessible, and the high output batteries typically are large, heavy and, otherwise, difficult to transport to the remote locations.

Fuel cells also are well known in the prior art and it is generally known that the smaller the fuel cell, the smaller the potential electric output of the fuel cell. The problem of small fuel cells producing small electric outputs typically has been addressed by connecting a fuel cell to one or more batteries which are configured to provide power for supplementing the electric output of the fuel cell when required. In this manner, when an electronic device being powered by a fuel cell requires more power than the fuel cell is capable of providing, such as during start-up of the fuel cell, the battery is utilized to provide the requisite power. Additionally, when the electronic device being powered by the fuel cell requires less power than the fuel cell is capable of providing, the battery is recharged by the excess electrical power of the fuel cell. For example, U.S. Pat. No. 3,823,358, issued to Rey, and U.S. Pat. No. 5,139,894, issued to Mizuno, disclose power systems configured in this manner.

Other prior art fuel cell power systems, such as disclosed in U.S. Pat. No. 4,670,702, issued to Yamada, incorporate a fuel cell, a battery and a controller. During warm up of the fuel cell of the Yamada device, the controller allows fuel cell output to charge the battery. As the fuel cell reaches operating temperature, the controller allows the battery to discharge to load, thereby reducing the required output of the fuel cell to maintain the load. The fuel cell is then utilized as the primary source of power until the fuel cell is shut down, then the controller once again allows fuel cell output to charge the battery.

In the aforementioned prior art power systems, the fuel cell is the primary DC power source for powering an electronic device. Additionally, the power output of each fuel cell is utilized for recharging its respective battery; therefore, these systems only are adapted to provide recharging power to batteries which require a recharging voltage that is less than or equal to the output voltage of the fuel cell or of the output voltages of multiple fuel cells arranged in series. This limitation often necessitates the use of larger fuel cells so that the required output voltage for battery recharging can be produced.

Therefore, there is a need to provide electrical power systems which overcome these and other shortcomings of the prior art.

BRIEF SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to an electrical power system which is adapted for recharging batteries. In a preferred embodiment, the power system includes a power source, i.e. a fuel cell, battery, solar cell, etc, that is configured to provide a first output voltage which is lower than the battery output voltage of a rechargeable battery to be charged. A voltage multiplier circuit is electrically interconnected to the power source and is configured to removably electrically interconnect with the rechargeable battery during charging. The voltage multiplier circuit is configured to receive the first output voltage from the power source, convert the first output voltage to a boosted voltage and provide the boosted voltage to the rechargeable battery. In order to facilitate the recharging of the rechargeable battery, the boosted voltage is provided at a voltage which is at least equal to the battery output voltage.

In accordance with another aspect of the present invention, the electrical power system of the present invention is adapted as a DC power source which can function as a replacement for conventional batteries, for instance. In a preferred embodiment, the power system includes a power source, a voltage multiplier circuit and a rechargeable battery. So configured, the power source and voltage multiplier circuit supply a "trickle charge" to the battery so that the battery is constantly being recharged.

In a preferred embodiment, the voltage multiplier circuit incorporates an input, an output and a plurality of charging capacitors interconnected between the input and the output, with the voltage multiplier circuit being configured to alternately electrically interconnect the plurality of charging capacitors in parallel and in series such that a voltage across the plurality of charging capacitors is intermittently added and provided as boosted voltage at the output. In some embodiments, the voltage multiplier circuit includes mechanical switches which cooperate to selectively configure the plurality of charging capacitors in parallel and in series.

In accordance with another aspect of the present invention, a preferred method for recharging a battery includes the steps of: (1) providing at least one power source configured to produce a first voltage output, with the first voltage output being less than the first voltage input required for charging the battery; (2) configuring a plurality of charging capacitors in parallel-configuration; (3) providing the first voltage output to charge the plurality of charging capacitors; (4) reconfiguring the plurality of charging capacitors in series-configuration, and; (5) discharging the plurality of charging capacitors to the battery.

In accordance with still another aspect of the present invention, a preferred method for providing power to an electronic device includes the steps of: (1) providing at least one power source configured to produce a first voltage output, the first voltage output being less than the first voltage input required to operate an electronic device; (2) recharging a rechargeable battery with the first voltage output when the battery requires recharging, and; (3) configuring the rechargeable battery to provide battery-generated voltage to power the electronic device, with the battery-generated voltage being greater than the first voltage input of the electronic device.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE SEVERAL VIEWS OF THE DRAWINGS

The accompanying drawings incorporated in and forming a part of the specification, illustrate several aspects of the present invention, and together with the description serve to explain the principles of the invention. In the drawings:

FIG. 3 is a schematic diagram illustrating a single stage of a circuit utilized to increase the output voltage of a relatively-low voltage output power source;

FIG. 4A illustrates the effective or operative circuit of the circuit illustrated in FIG. 4, when a voltage is applied to the input of the circuit;

FIG. 4B illustrates the effective or operative circuit of the circuit illustrated in FIG. 4, when the voltage applied to the input of the circuit is changed to a near zero value;

Figure 1:
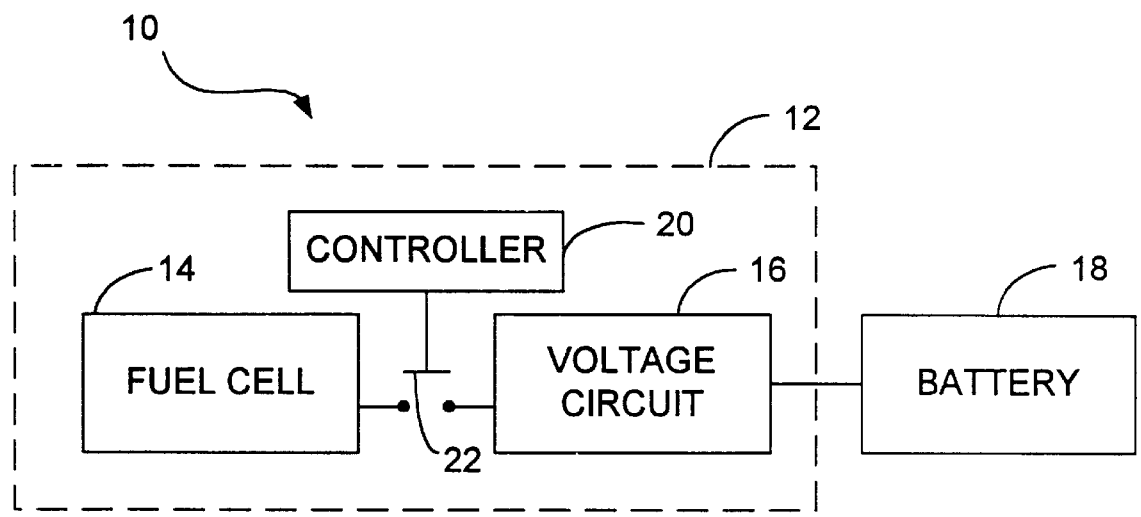
FIG. 1 is a top-level block diagram of a preferred embodiment of the present invention.

Reference will now be made in detail to the description of the invention as illustrated in the drawings, wherein like reference numbers indicate like parts throughout the several views. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

DETAILED DESCRIPTION OF THE PREFERRED EMBODIMENT

Referring now to FIG. 1, a preferred embodiment of the electrical power system 10 of the present invention incorporates a charger section 12 which includes a power source 14, such as a fuel cell, battery, solar cell, etc., and a voltage multiplier circuit 16, described in detail hereinafter (for ease of description and not for purposes of limitation, power source 14 will be referred to hereinafter as a fuel cell). The charger section 12 can incorporate a housing to retain the fuel cell and voltage multiplier circuit as an independent unit which can be adapted to engage and recharge batteries 18 of various types, sizes and configurations. A controller 20 also can be provided (described in detail hereinafter).

As shown in the embodiment of FIG. 1, battery 18 can be provided as a component of power system 10, with the system 10 typically being adapted for use as a power source, e.g. the output of battery 18 being arranged to provide electrical power to an electronic device while the battery is electrically connected to the charger section 12. In operation, battery charging continues as long as fuel is provided to the fuel cell and as long as the battery 18 requires charging. Since the fuel cell is self-actuating, based upon current draw at the output of the fuel cell, when demand for battery recharge power increases, the fuel cell increases current output. Likewise, when battery charging is completed, reduced battery demand for recharge power causes the fuel cell to shut down. So configured, the battery 18 receives a "trickle charge" from the fuel cell, thereby providing a battery which is continuously being recharged for its next use. However, in other embodiments, power system 10 can be configured as a recharging system for recharging batteries 18. In these embodiments, the battery 18 is oriented so that its terminals engage appropriate outputs of the charger section 12 during charging. After charging, battery 18 then can be disengaged from the charger section 12 and independently utilized for powering an electronic device.

The voltage multiplier circuit 16 has both an input and an output. The input receives relatively-low voltage (the term relatively-low voltage referring to a voltage which is lower than that required to recharge the battery 18) from one or more fuel cells 14, with the relatively-low voltage being converted to a boosted voltage by the multiplier circuit 16. The boosted voltage is then applied to the output and then is delivered to the battery 18. As will be described in more detail hereinafter, the operation of the multiplier circuit 16 of a preferred embodiment performs in response to an oscillatory input signal. Preferably, the input oscillates between a near zero voltage value and some positive voltage value. However, it will be appreciated by those skilled in the art that similar operation could be achieved with a pure oscillatory input signal. Indeed, even for purposes of the preferred embodiment, a pure oscillatory input signal (i.e., both positive and negative going values) could be converted simply by inserting a diode into the input circuit to clip the negative going voltage value, and thus achieve an input signal oscillating between some positive voltage value and a near zero voltage value. Indeed, as previously mentioned, depending upon the needs of a particular application, the oscillating or time-varying aspect of the input signal may include an oscillatory voltage that oscillates between a positive and negative going voltage, or a voltage that oscillates between some positive or negative value and a near zero value. Alternatively, the time-varying aspect may simple mean a voltage that varies on a one time basis, whether that variance is between some positive and negative value, or between some value and a near zero value.

Merely for purposes of illustration, FIG. 1 is shown as having a controller 20 which operates a switch 22. The switch 22 is illustrated as a normally-open, momentarilyclosed oneway switch. The output of fuel cell 14 is applied to the input of the voltage multiplier circuit 16 when the switch 22 is closed, and is removed from the input of the voltage multiplier 16 when the switch 22 is opened. The controller 20 operates to open and close the switch 22 so as to apply and remove the relatively-low voltage of fuel cell 14 from the input of the voltage multiplier circuit 16.

The switch 22, fuel cell 14, and controller 20 together illustrate the functionality of an oscillatory voltage applied to the input of the voltage multiplier circuit. The actual circuit used to implement this feature will necessarily vary from embodiment to embodiment in a manner that will be understood by one of ordinary skill in the art. For example, in one embodiment, the input circuit can be controlled to repeatedly oscillate the voltage applied to the input, so as to allow a large storage or tank capacitor, disposed across the output, to charge. Periodically, the output would be controlled to discharge to the battery 16. In another embodiment, the input circuit may be controlled in a "one-shot" fashion. In such an embodiment, the output would be controlled to discharge for each oscillation of the input, thereby applying a smaller charge to the battery than that which would be applied with the tank capacitor embodiments.

Figure 2:
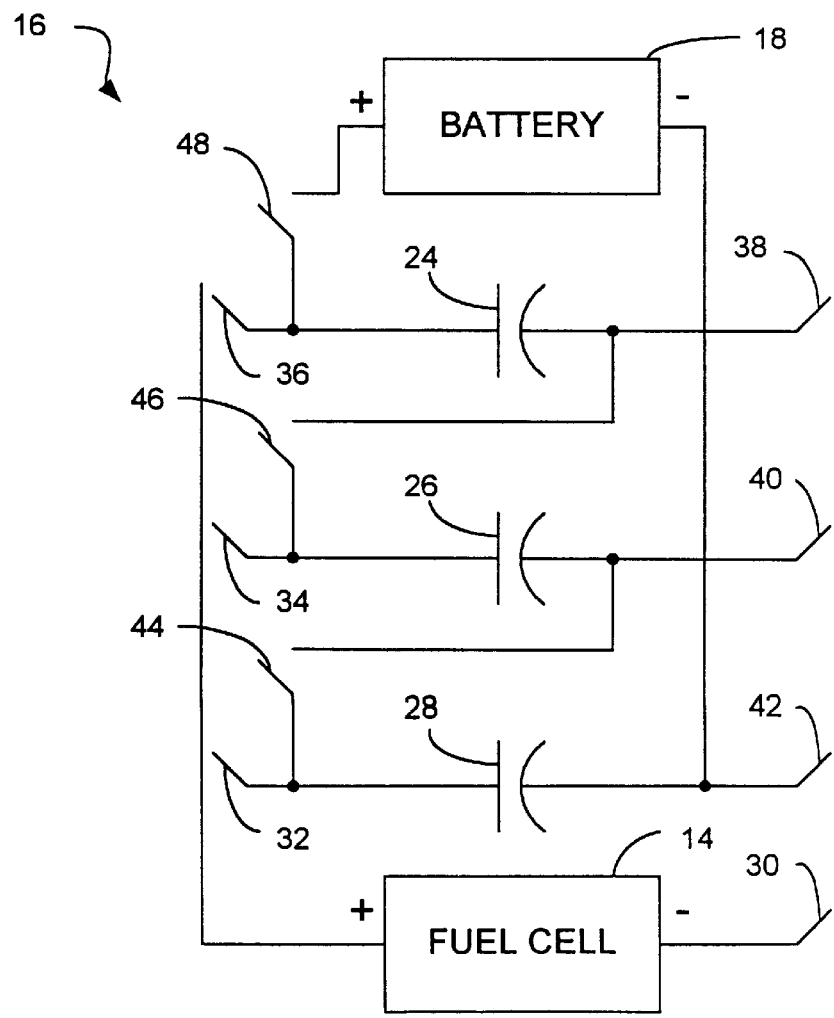
FIG. 2 is a schematic diagram illustrating a preferred embodiment of the voltage conversion circuit.

FIG. 2 illustrates a preferred embodiment of the voltage multiplier circuit 16 having three capacitors 24, 26 and 28, which are interconnected with conventional mechanical switches (30, 32, 34, 36, 38, 40, 42, 44, 46 and 48), such as reed relays, among others. Fuel cell 14 provides charging power to the capacitors 24, 26 and 28, with the switches arranged in a parallel-capacitor configuration (e.g. 30, 32, 34, 36, 38, 40, and 42 on, and 44, 46 and 48 off). When the capacitors have sufficiently charged, the switch positions are reversed, thereby connecting the capacitors in series-capacitor configuration to provide their voltage to the output of the circuit. This amplified or boosted voltage is then provided to the battery 18 for charging. The contact points of the switches also can incorporate gold plating to improve the efficiency of the circuit.

In some embodiments (not shown), the voltage multiplier circuit 16 can incorporate a storage or tank capacitor disposed across the output of the fuel cell. So configured, the circuit can be controlled to repeatedly oscillate the switches between the parallel-capacitor configuration and the series-capacitor configuration, so as to allow the tank capacitor to charge when the switches are in the series-capacitor configuration (e.g. discharging to output), and to allow the tank capacitor discharge to the battery when the switches are in the parallel-capacitor configuration (e.g. charging). Additionally, oscillation of the switches can be accomplished by a device, such as a multi-vibrator, among others, which normally biases the switches to the parallel-capacitor configuration, and which positions the switches to the series-capacitor configuration, such as when demand for recharge power from the battery is sensed. For embodiments of the circuit 100 incorporating the multi-vibrator, the switches also can be ganged so that only one multi-vibrator is required to simultaneously position all of the switches.

Turning now to FIGS. 3–6, reference is made to alternative embodiments of the voltage multiplier circuit constructed in accordance with the power system 10 of the present invention. As will be further described below, the voltage multiplier circuit 16 can include a plurality of identically constructed stages or sections. For simplicity of description, FIG. 3 illustrates a single stage, and for that reason, will be first described in order to facilitate the understanding of the multi-stage implementation of several other embodiments of the circuit.

As shown in FIG. 3, embodiment 100 of the voltage multiplier circuit having two charging capacitors 132 and 134 interconnected, in part, through a transistor 136. In the preferred embodiment, a field effect transistor is utilized; however, a bipolar transistor can be used for certain applications and embodiments as well. Diodes 140, 141, 142, 143, 144, 145, and resistor 150 also are interconnected as illustrated in FIG. 3. Optionally, a storage or tank capacitor 160 can be provided across the output terminals for storing and accumulating a larger charge. In a manner that is known by those skilled in the art, by switching the operation of the voltage multiplier circuit to intermittently provide the boosted voltage across the output terminals, over time charge may be accumulated and stored in the tank capacitor 160. Then, when needed, the stored charge can be delivered as boosted voltage to battery 18 for recharging the battery.

The voltage multiplier circuit 100 operates by applying a relatively-low voltage input supplied from the fuel cell 14 across a plurality of capacitors, to charge those capacitors in parallel fashion. Then, once those capacitors have reached a charge of sufficient level, they are switched into a series relationship so that voltage accumulated across each charging capacitor is added to form a larger voltage value (boosted voltage), which is placed across the output of the circuit. This boosted voltage is then delivered to the battery 18, as required, in order to recharge the battery. Therefore, as would be understood by one of ordinary skill in the art, the amplification of the voltage multiplier circuit is proportional to the number of charging capacitors that are disposed in parallel relation.

Reference is now made to FIGS. 4A and 4B to more particularly describe the operation of the circuit 100 illustrated in FIG. 3. As previously described, the relatively-low voltage provided by fuel cell 14 is applied to the input, or input terminals 162 in a time-varying or oscillatory fashion. Preferably, the voltage applied to input will vary between some positive value (as indicated by the polarity of the input terminals 162) and some value near zero value, such as by operation of the controller 20 and switch 22. FIG. 4A illustrates the effective, or operative, circuit components when a positive voltage value is applied to the input 162, and FIG. 4B illustrates the effective or operative circuit components when the voltage is removed from the input.

To explain in more detail, when a positive voltage is applied at the input 162, that voltage is also applied across the series connection of diode 140, capacitor 132, and diode 142. Similarly, the same input voltage is, in parallel fashion, applied across the series connection of diode 141, capacitor 134, and diode 143. Neglecting the relatively small voltage drop across each of the diodes, the vast majority of the input voltage at 162 is present across both capacitors 132 and 134. This voltage has been denoted in the drawings as Vi. In this respect, and again ignoring the voltage drop across the diodes 140, 141, 142, 143, and 144, capacitors 132 and 134 are effectively connected and parallel. Therefore, the same voltage Vi is applied across both capacitors 132 and 134 to simultaneously charge each capacitor. For purposes of the broad concepts and teachings of the present invention, the diodes 140, 141, 142, 143, 144 and 145 are functional, and it is irrelevant whether they are constructed from silicon, germanium, gallium arsenide, or some other semi-conductive material. Certainly, as will be appreciated by those skilled in the art, one material or type of diode may be preferred over another for a given use or embodiment of the invention.

As shown in FIG. 4A, as a positive value input voltage is applied at 162, the transistor 136 is effectively removed from the circuit. This is because diode 144 prevents the transistor 136 from turning on. Stated another way, the voltage drop across diode 144 is equal to that across diode 142. Therefore, the potential or voltage at the gate 173 of the transistor is the same as the potential at the drain 170 (see FIG. 3) of the transistor 136, and therefore, the transistor 136 cannot turn on. When, however, the charging capacitors 132 and 134 have charged to a sufficient level and the voltage is removed from the input 162, then the circuit of FIG. 3 effectively becomes that illustrated in FIG. 4B. For purposes of this discussion, it will be assumed that the capacitors 132 and 134 sufficiently charge to a level Vi. Upon removal of the input voltage, the charge of capacitor 132 causes the transistor 136 to turn on. Diodes 142 and 144 become reverse biased and effectively drop from the circuit, and the capacitors 132 and 134 become series connected through the source and drain of transistor 136. Again, ignoring the voltage drop across the transistor 136, and the voltage drop across diode 145, the value of the voltages stored in capacitors 132 and 134 will be added and applied to the output 180. Thus, the voltage at the output will be approximately 2Vi. As previously described in connection with FIG. 3, a tank capacitor 160 can be applied across the output so that the voltage 2Vi operates to charge this tank capacitor 160.

Figure 5:
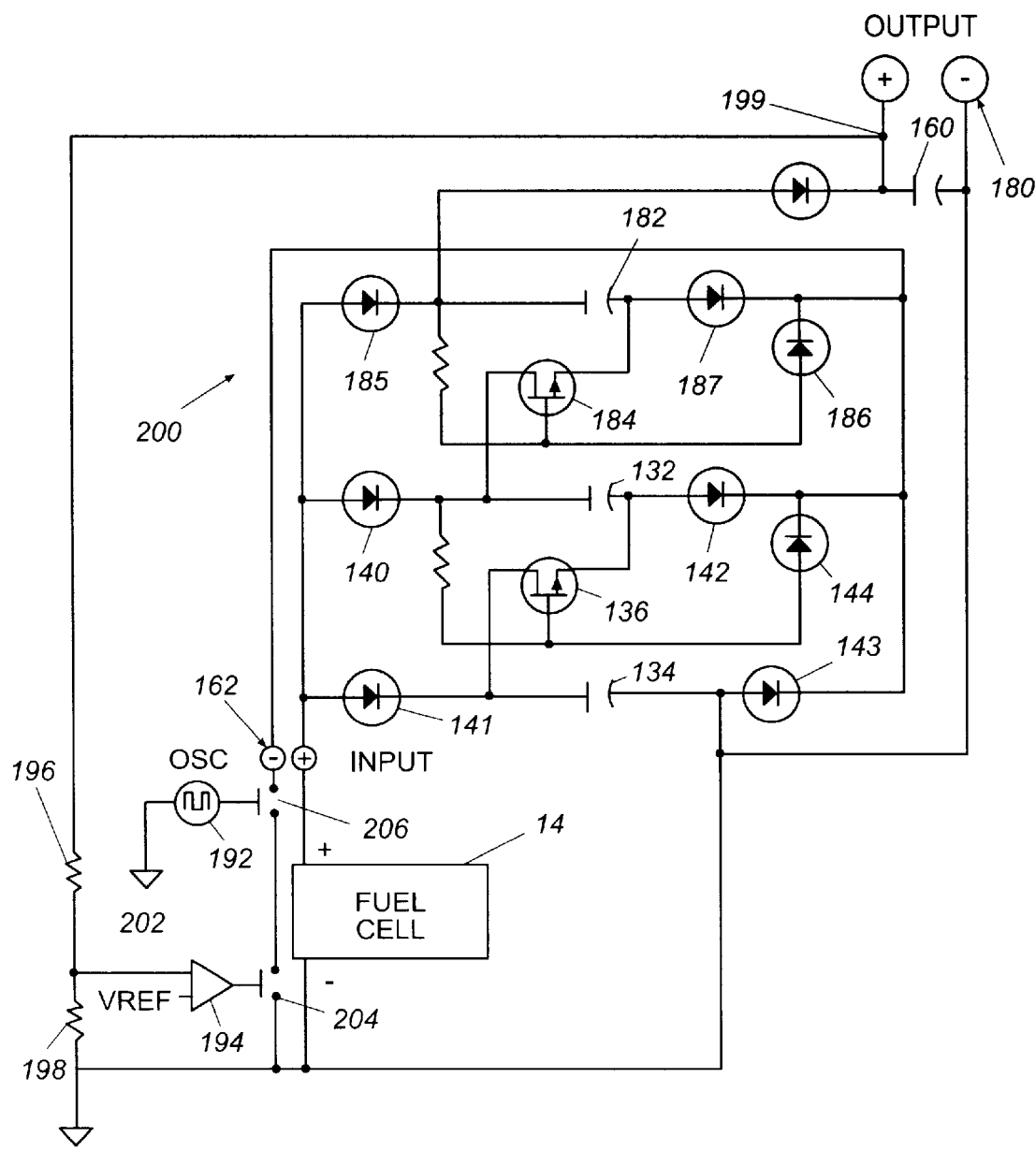
FIG. 5 is a schematic diagram similar to that of FIG. 4, but illustrating a multiple staged circuit, along with an diagrammatic input circuit for effecting an oscillation of the input voltage.

Reference is now made to FIG. 5 which shows a similar, but expanded circuit embodiment 200 of the voltage multiplier circuit. An additional capacitor 182 is added so that there are three capacitors 182, 132, and 134 operating within the circuit. The operation of the lower part of the circuit (that including capacitor 132 and 134 and transistor 136, along with the surrounding diodes 140, 141, 142, 143 and, 144) operates in a fashion similar to that described in connection with the circuit of FIGS. 3, 4A, and 4B. An additional stage, however, is added to this circuit which includes capacitor 182, transistor 184, and diodes 185, 186 and 187. Without presenting a detailed description like that presented in connection with FIG. 3, it will be understood by one skilled in the art that the overall circuit of FIG. 5 operates much like that described in connection with FIG. 3. Specifically, when a voltage is applied to the input 162, that same voltage (ignoring the voltage drop across the diodes) is applied across capacitors 182, 132, and 134. In this way, these three capacitors are effectively connected and parallel. Then, when the voltage source is removed from the input terminals 162, and in the manner described in connection with FIG. 4B, the capacitors 182, 132, and 134 become effectively connected in series through transistors 184 and 136. The sum of the three individual voltages across each of the capacitors then is applied to the output 180.

FIG. 5 further illustrates a very simplistic input voltage control circuit, incorporating fuel cell 14, and oscillator 192 and a comparator 194. As will be described below, this circuit is configured to operate in such a way as to apply the input voltage from fuel cell 14 across the input terminals 162 in an oscillatory fashion, until such time as the tank capacitor 160 at the output 180 has charged to a sufficient level. Thereafter, the fuel cell 14 is effectively disconnected from the input. In this regard, the predetermined output voltage can be set to be equal to a reference value denoted as VREF, and this value can be applied to one of the inputs of comparator 194. The output voltage at junction 199 is divided across resistors 196 and 198, so that the value at an intermediate junction 202 is connected to the other input of comparator 194. Certainly, by choosing values of resistors 196 and 198 to effect the ratios therebetween, one can adjust the value by which the comparator 194 becomes operative.

In operation, the switch 204 would be closed by comparator 194 until the output has reached a level sufficient to turn the capacitor 194 on and thus open the switch 204, effectively removing the fuel cell 14 from the input by opening the circuit at the negative going terminal of the input 162. While the switch 202 remains closed, and thus the circuit operative, oscillator 192 may be used to intermittently open and close switch 206 to thus provide the time varying application of the fuel cell 14 to the input 162. Again, the input circuit embodied in FIG. 6 is not necessarily reflective of the preferred embodiment, but merely is provided to be illustrative of how a controlled input can be applied by a fuel cell 14 to the multiplier circuit.

Figure 6:
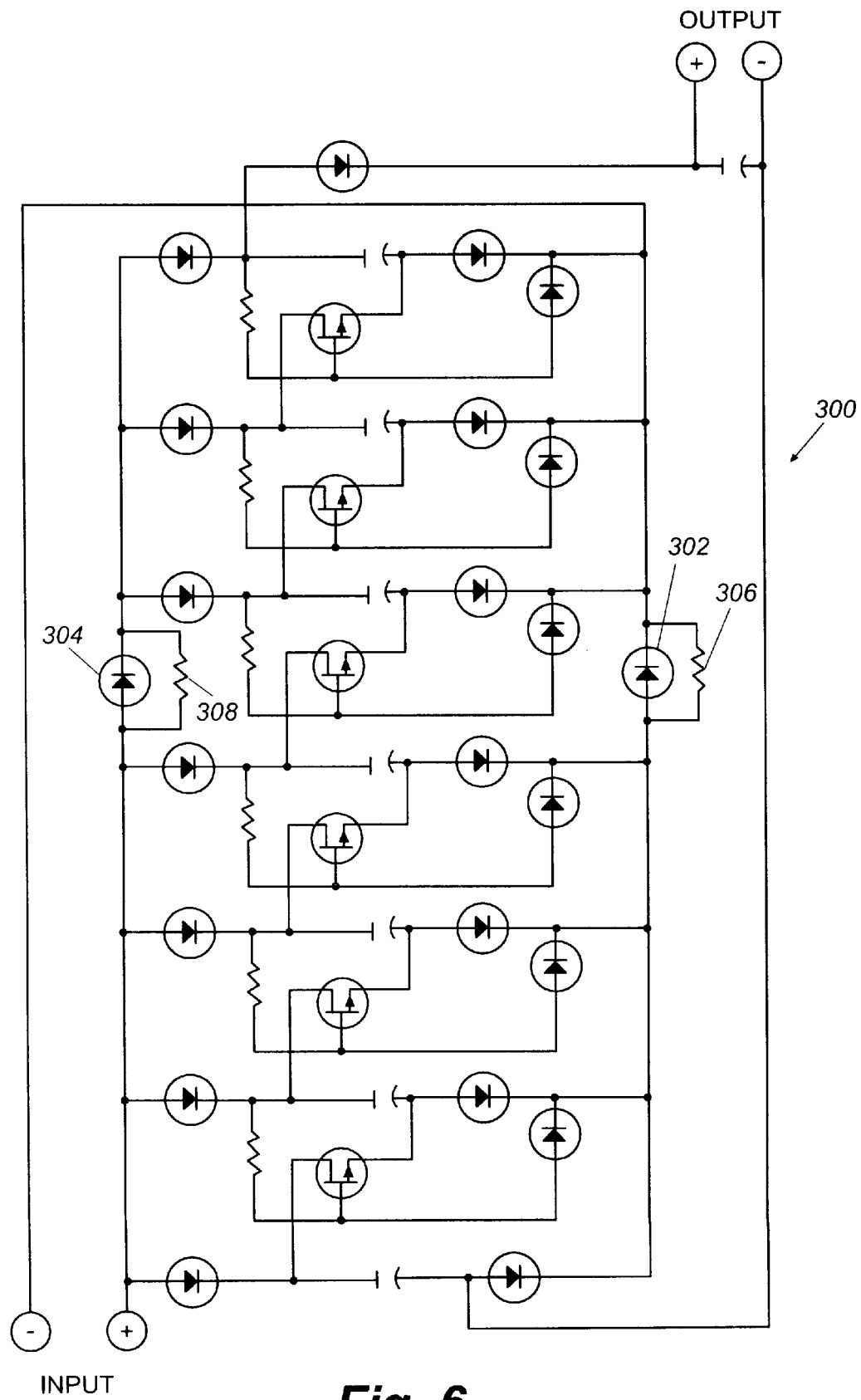
FIG. 6 is a schematic diagram illustrating a multi-staged converter circuit constructed in accordance with one aspect of the present invention.

Reference is briefly made to FIG. 6 which shows yet a further embodiment of the multiplier circuit. The embodiment 300 illustrated in FIG. 6 shows a circuit similar to that described in both FIGS. 3 and 5, having even a greater number of multiplier stages. In addition, this embodiment illustrates the use of bipolar transistors rather than field effect transistors, and further illustrates the use of diodes 302 and 304. Functionally, these diodes 302, 304 do not effect the broad functional operation of the circuit. However, in practice, it is preferred to provide high voltage diodes 302 and 304 in connection with large resistors 306 and 308 (e.g., 10 mega-ohm) to help spread the leakage current realized by the other diodes of the circuit. This feature becomes particularly important as the number of stages for the multiplier circuit 16 is increased. Although FIG. 6 has illustrated one diode/resistor pair on each side of the circuit, multiple diode resistor pairs could be similarly disposed along each side.

One advantage of the present invention is that the components can be entirely implemented in a solid state integrated circuit, and therefore manufactured at a relatively low cost. Furthermore, by operating exclusively electronically, the multiplier circuits described hereinabove operate much more efficiently than do those of the type utilizing a step-up transformer. As will be further appreciated, the component values of resistor 306 and capacitor 308 will be selected based upon the charging capacitors utilized in the multiplier circuit. Specifically, component values will be chosen to allow the charging capacitors to sufficiently charge.

It should also be noted that efficiency of the voltage multiplier circuit 16 (FIG. 2) can be greater than that of the aforementioned electronic embodiments, particularly when used with low voltage output power sources, such as a low voltage output fuel cell, because the mechanical switches do not include the voltage drops associated with the diodes and transistors of the other embodiments. This allows a single fuel cell to charge a battery having a higher voltage than the output of the fuel cell since the fuel cell voltage output does not need to overcome the voltage drops associated with the aforementioned diodes and transistors in order to enable the multiplier circuit.

The foregoing description has been presented for purposes of illustration and description. It is not intended to be exhaustive or to limit the invention to the precise forms disclosed. Obvious modifications or variations are possible in light of the above teachings. The embodiment discussed, however, was chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

I claim:

1. An electrical power system for powering an electronic device, comprising:

a power source configured to provide a first output voltage, and;

a rechargeable battery communicating with said power source, said rechargeable battery configured to provide a second output voltage, said second output voltage being higher than said first output voltage;

said power system having a voltage multiplier circuit interconnected between said power source and said rechargeable battery, said voltage multiplier circuit having an input, an output and a plurality of charging capacitors interconnected between said input and said output, said voltage multiplier circuit configured to electrically interconnect said plurality of charging capacitors in parallel when said first output voltage is present at said input, and further configured to electrically interconnect said plurality of charging capacitors in series when said first output voltage at said input is approximately zero, said voltage multiplier circuit configured such that said first output voltage across said plurality of charging capacitors is added and provided as boosted voltage at said output, said boosted voltage being provided to said rechargeable battery to recharge said rechargeable battery.

2. The power system of claim 1, wherein said power source is a fuel cell.

3. The power system of claim 1, wherein said voltage multiplier circuit has mechanical switches, such that said mechanical switches cooperate to selectively configure said plurality of charging capacitors in parallel and in series.

4. An electrical power system for powering an electronic device comprising:

a power source configured to provide a first output voltage, and;

a rechargeable battery communicating with said power source, said rechargeable battery configured to provide a second output voltage, said second output voltage being higher than said first output voltage;

said power system having a voltage multiplier circuit interconnected between said power source and said rechargeable battery, said voltage multiplier circuit having an input and an output and at least one stage for increasing said first output voltage between said input and said output, each of said stages comprising:

a first and second capacitor;

a transistor interposed between said first and second capacitors; and a plurality of diodes interconnected among said transistor and said first and second capacitors, said plurality of diodes being configured to respond to said first output voltage applied to said input so that when a voltage is present at said input said first and second capacitors are effectively connected in parallel across said input, said plurality of diodes being further configured to respond to said first output voltage applied to said input so that when said first output voltage is near zero, said first and second capacitors are effectively connected in series-configuration through said transistor, so that a voltage across each of said first and second capacitors is added and applied as boosted voltage to said output.

5. An electrical power system for powering an electronic device, the electronic device requiring a first voltage input for operation, said power system comprising:

a power source configured to provide a first voltage output, said first voltage output being lower than the first voltage input of an electronic device; and a voltage multiplier circuit having an having an input, an output, a plurality of charging capacitors interconnected between said input and said output, and a plurality of switches configured to electrically interconnect said plurality of charging capacitors in parallel when said first voltage output of said power source is present at said input, said plurality of switches further configured to electrically interconnect said plurality of charging capacitors in series when said first voltage output of said power source at said input is near zero, said voltage multiplier circuit configured such that said first voltage output of said power source across said plurality of charging capacitors is added and provided as boosted voltage at said output, said boosted voltage being at least equal to the first input voltage of the electronic device.

6. The power system of claim 5, wherein said plurality of switches are configured to electrically interconnect said plurality of charging capacitors in series when said first voltage output of said power source at said input is zero.

7. The power system of claim 5, wherein said power system has a rechargeable battery communicating with said voltage multiplier circuit, said rechargeable battery configured to receive said boosted voltage to recharge said rechargeable battery, said rechargeable battery further configured to provide battery-generated voltage to an electronic device, said battery-generated voltage being at least equal to the first voltage input of the electronic device.

8. The power system of claim 7, wherein said power source is a fuel cell.

9. A method for providing power to an electronic device, the electronic device requiring a first voltage input for operation, said method comprising the steps of:

providing at least one power source, said power source configured to produce a first voltage output, said first voltage output being less than the first voltage input of an electronic device;

recharging the rechargeable battery with said first voltage output when said battery requires recharging by:

applying said first voltage output to an input, said first voltage output comprising a time-varying input voltage;

when an input voltage is present across said input, configuring a plurality of charging capacitors in parallel-configuration across said input to charge said plurality of charging capacitors, and;

reconfiguring said plurality of charging capacitors in series-configuration, in response to a change in magnitude of said input voltage, and applying the cumulative charge of said plurality of charging capacitors to an output; and configuring said rechargeable battery to provide battery-generated voltage to power the electronic device, said battery-generated voltage being at least equal to the first voltage input of the electronic device.

10. The method of claim 9, wherein said power source is a fuel cell.

* * * * *